United States Patent
Nagarajan

(10) Patent No.: US 6,204,954 B1
(45) Date of Patent: Mar. 20, 2001

(54) TECHNIQUE FOR MEASURING THE VPI-AC OF A MACH-ZEHNDER MODULATOR

(75) Inventor: Rajkumar Nagarajan, Ottawa (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/401,522

(22) Filed: Sep. 22, 1999

(51) Int. Cl.$^7$ ..................................................... G02F 1/01
(52) U.S. Cl. ............................ 359/279; 359/276; 359/278
(58) Field of Search .............................. 359/279, 276, 359/278, 237, 238

(56) References Cited

U.S. PATENT DOCUMENTS 6,046,838 * 4/2000 Kou et al. ........................... 359/276

OTHER PUBLICATIONS

Shingo Uehara, "Calibration of optical modulator frequency response with application to signal level control", Applied Optics, vol. 17, No. 1, Jan. 1, 1978, pp. 68 to 71.

* cited by examiner

Primary Examiner—Hung Xuan Dang

(57) ABSTRACT

In an optical communication system, efficient use of a Mach-Zehnder modulator requires accurate knowledge of the AC halfwave voltage at the desired modulation frequency. At high modulation frequencies this can be difficult to measure directly. A method of accurately measuring the AC halfwave voltage of a Mach-Zehnder modulator is described. The Mach-Zehnder modulator is biased at the peak of the transfer function curve and a sinusoidal signal of known amplitude and the desired frequency of measurement is applied. The optical power is measured with and without the sinusoidal signal. The ratio of the two optical powers is used in the Mach-Zehnder transfer equation to calculate the AC halfwave voltage.

16 Claims, 3 Drawing Sheets ized by a Mach-Zehnder transfer function (see FIG. 1).

TECHNIQUE FOR MEASURING THE VPI-AC OF A MACH-ZEHNDER MODULATOR

FIELD OF THE INVENTION

This invention relates to the determination of the half-wave voltage of a Mach-Zehnder modulator.

BACKGROUND OF THE INVENTION

In a Mach-Zehnder (MZ) interferometer, an optical signal is split and passed along two optical paths before recombining. Each optical path lies along a different branch of the transmission medium, and may have different optical lengths due to different refractive indices of the medium in each branch. On recombining, different frequencies of the optical signal will interfere to different degrees, depending on the difference in optical length between the two paths. At frequencies for which the different optical lengths result in a phase difference of $\pi$ radians the signals along each branch will destructively interfere at the output of the MZ interferometer. At frequencies for which the different optical lengths result in no phase difference the signals along each branch will constructively interfere.

In an MZ modulator, a voltage is applied to the two branches of the interferometer. This alters the relative refractive indices of the branches, thereby altering their relative optical lengths. The amount of constructive interference for a particular frequency (typically a carrier frequency of the optical signal) at the output of the MZ modulator can be varied by varying the voltage applied to the two branches. By modulating the applied voltage, the optical signal can be modulated. The relationship between the applied voltage and the output power at a particular frequency can be represented by a Mach-Zehnder transfer function (see FIG. 1).

The halfwave voltage, $V_\pi$ (or Vpi), of an MZ modulator is defined as the difference between the applied voltage at which the signals in each branch of the MZ modulator are in phase and the applied voltage at which the signals are $\pi$ radians out of phase. In other words, $V_\pi$ is the voltage difference between maximum and minimum output signal power (see FIG. 1). In order for an MZ modulator to be used most efficiently in a communications network it is necessary to know the value of $V_\pi$ accurately. The $V_\pi$ of an MZ modulator is an important parameter, for example, for determining RF-driver settings.

If the applied voltage is an AC voltage, as it must be to modulate the optical signal, then the halfwave voltage becomes difficult to determine. The voltage is applied along travelling wave electrodes which are parallel to the optical transmission medium. Ideally the voltage wave travels along each electrode such that the optical signal is adjacent to a constant voltage while within the MZ modulator. However in reality the voltage seen by the optical signal is not constant, due to attenuation of the voltage along the electrodes and to the difference between the group velocities of the electrical and optical signals. The $V_\pi$ used by the RF-driver to effect 180° phase shifts cannot be determined from the ideal $V_\pi$ for applied DC voltages, but rather must be dependent on the modulation frequency. This halfwave voltage is called the AC halfwave voltage, $V_\pi$-AC (or Vpi-AC).

One method of determining $V_\pi$-AC at all modulation frequencies would be to determine $V_\pi$-AC accurately at one modulation frequency, and then use the measured small signal frequency response of the MZ modulator to calculate the $V_\pi$ at other frequencies. The measured small signal frequency response of the MZ modulator is generally lower than the theoretical frequency response, due to the losses which occur with AC modulation. Commercial network analyzers can be used to measure the small signal frequency response of an MZ modulator over modulation frequency ranges of about 130 MHz to 30 GHz.

One existing technique for measuring $V_\pi$-AC uses modulations having a high peak-to-peak voltage, but these are difficult to implement at high frequencies and require the use of specialized equipment. Another technique uses variations in amplitude of a square wave modulation. However this technique relies on eyeballing. The technique is limited by the accuracy of the eyeballing, and square wave modulation is not a scientifically accurate method of determining signal parameters due to the multitude of harmonics making up the waveform.

There is therefore a need for a method of measuring $V_\pi$-AC more accurately, more consistently, and in a simpler manner.

SUMMARY OF THE INVENTION

Broadly, the invention may be summarized as a method of determining the AC halfwave voltage of a Mach-Zehnder modulator (MZM) by biasing the MZM at the peak of the transfer function curve and applying an AC voltage, preferably sinusoidal, of known amplitude and desired frequency. The optical power is measured with and without modulation and these two measured values or the ratio thereof together with the frequency and amplitude values can be used to determine from the Mach-Zehnder transfer equation the value for $V_\pi$-AC at the desired frequency.

More particularly, the DC bias voltage and a small AC modulation voltage are applied to the MZ modulator. The peak is found accurately by adjusting the DC bias voltage until the first and third harmonics of the frequency modulated optical output signal disappear. The average output power of the modulator is measured while the AC modulation voltage is being applied, and then measured again after the AC modulation voltage has been switched off. The AC halfwave voltage can then be calculated from the values of the average output power and from the frequency and amplitude.

The invention also is directed to a computer readable medium carrying a computer program for carrying out the steps of the invention.

BRIEF DESCRIPTION OF THE DRAWINGS

The invention will now be described in greater detail with reference to the accompanying diagrams, in which.

DETAILED DESCRIPTION OF THE PREFERRED EMBODIMENTS

Figure 1:
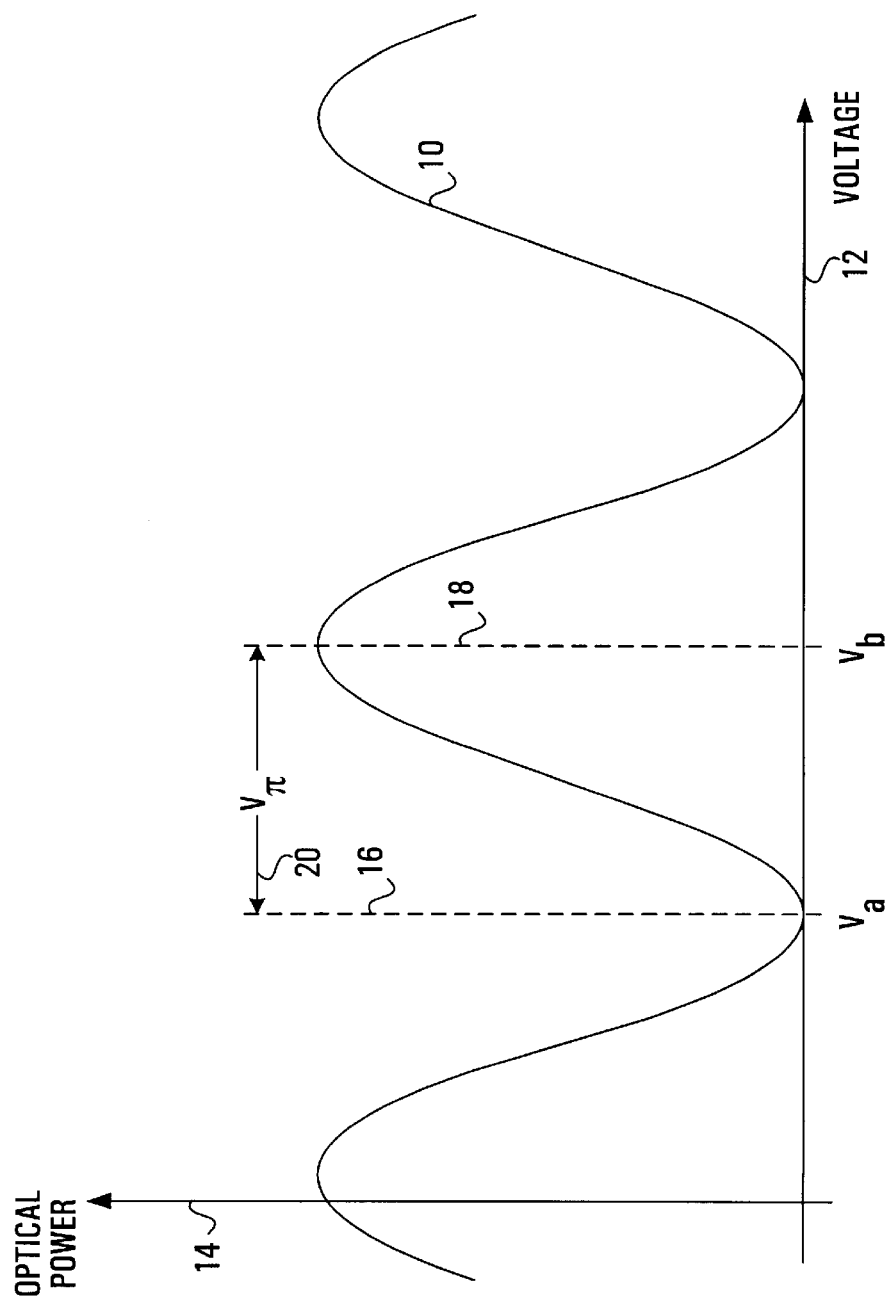
FIG. 1 is a plot of the Mach-Zehnder transfer function of a Mach-Zehnder modulator.

FIG. 1 illustrates the Mach-Zehnder (MZ) transfer function 10 of an MZ modulator for an individual frequency of the optical signal. When a voltage 12 is applied to the MZ modulator the optical lengths of the two branches of the MZ modulator are changed, as is the degree of interference between the signals along each branch at the particular optical frequency. By varying the voltage 12 the degree of interference is varied, thereby varying the power 14 of the optical signal at the output of the MZ modulator at the particular optical frequency. If the voltage 12 is set to a value of $V_a$, denoted by line 16, then the signals along the two branches are π radians out of phase, there is complete destructive interference, and the power 14 of the optical signal at the output of the MZ modulator is zero. If the voltage 12 is set to a value of $V_b$, denoted by line 18, then the two signals are in phase, there is complete constructive interference, and the power 14 of the optical signal at the output of the MZ modulator is equal to the power of the optical signal at the input of the MZ modulator. The half-wave voltage $V_\pi$, denoted by double headed arrow 20, is the difference between the voltage resulting in complete destructive interference and the voltage resulting in complete constructive interference. There are of course many possible values of $V_a$ and $V_b$, corresponding to each minimum and maximum value of the power 14 respectively.

Figure 2:
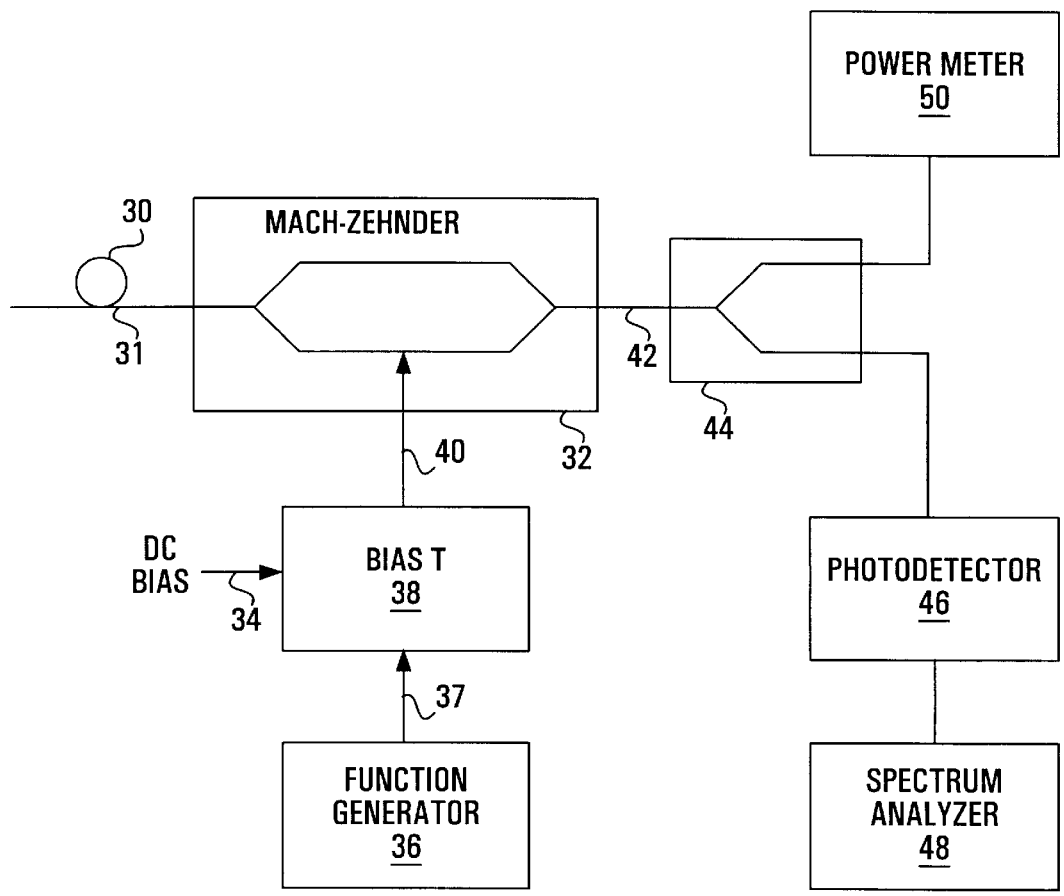
FIG. 2 is a block diagram of the components which can be used to carry out the invention.

FIG. 2 illustrates components for measuring the AC halfwave voltage $V_\pi$-AC according to the method of the invention. An optical signal 31 enters from a fiber optic cable 30 into a Mach-Zehnder modulator 32, where it is split along two branches. An applied voltage 40 is applied to the MZ modulator. The applied voltage 40 changes the relative phase of the two branches of the optical signal, generally resulting in an output optical signal 42 of lower power than the input optical signal (unless the applied voltage is such that there is no phase difference between the two branches of the optical signal). The applied voltage 40 consists generally of a DC bias voltage 34 combined with an AC voltage 37 generated by a function generator 36. The DC bias voltage 34 and the AC voltage 37 are combined using a bias T-junction 38. The output optical signal 42 is divided using a 3-db coupler 44. Part of the optical signal passes to a power meter 50, and part passes to a photodetector 46. The photodetector 46 generates an electrical signal which passes to a spectrum analyser 48.

The invention requires the DC bias voltage 34 to be located at a peak $V_b$ denoted by line 18. A peak can be located by applying a small sinusoidal AC voltage 37 of frequency f and amplitude $V_{in}$ about the DC bias voltage 34. When the DC bias voltage 34 is at a peak $V_b$ or a minimum $V_a$ of the MZ transfer function 10, the symmetry of the transfer function causes the first and third harmonic of the modulating frequency f to disappear and most of the spectral energy is concentrated on the second harmonic. The approximate peak is located by monitoring the power meter 50 to detect a near maximum value, and then the precise peak is located by adjusting the DC bias voltage 34 until the spectrum analyser 48 shows only the second harmonic of the modulating frequency f. At this point the DC bias voltage 34 is at a value of $V_b$ and the power 14 is at a maximum.

Figure 3:
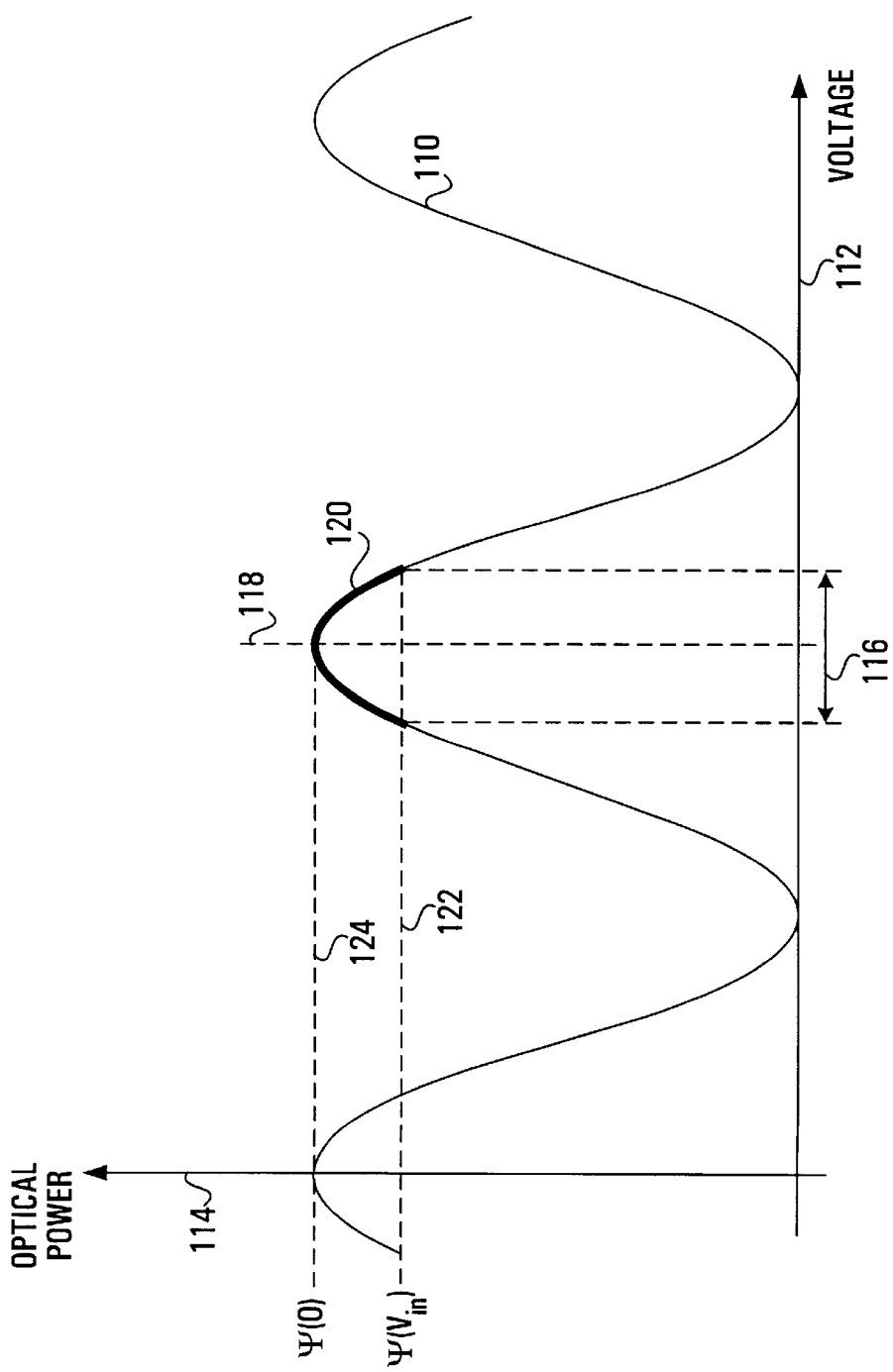
FIG. 3 is a plot of the Mach-Zehnder transfer function when a sinusoidal modulating signal is applied to the Mach-Zehnder modulator.

The transfer function for an MZ modulator with a DC bias voltage 34 set at a value of $V_b$ and with a small sinusoidal AC voltage 37 of frequency f and amplitude $V_{in}$ is shown in FIG. 3. The AC voltage 116 oscillates about the DC bias voltage 118. The power 114 at the output of the MZ modulator oscillates along the curve 120, and has an average power of $\psi(V_{in})$, denoted by the line 122. If the AC voltage 116 is switched off, the power 114 at the output of the MZ modulator has a value of $\psi(0)$, denoted by the line 124.

$\psi(V_{in})$ has a theoretical value given by $$\psi(V_{in}) = A(1/T)\int_0^T \left[\cos\left(\frac{\pi}{2V_\pi}V_{in}\cos\left(\frac{2\pi}{T}t\right)\right)\right]^2 dt$$

where A is a constant which depends upon the launched carrier wave optical power and the insertion loss in the system, and T=1/f. The inner cosine term represents the modulating AC signal, and the outer cosine term results from the Mach-Zehnder transfer function. There is no phase shift within the outer cosine because the DC bias voltage has been set at a value of $B_b$. By setting $V_{in}=0$ it is seen that $$\psi(0)=A$$

and so the normalised power is given by $$\psi_N(V_{in}) = \frac{\psi(V_{in})}{\psi(0)} = (1/T)\int_0^T \left[\cos\left(\frac{\pi}{2V_\pi}V_{in}\cos\left(\frac{2\pi}{T}t\right)\right)\right]^2 dt$$

To measure $V_\pi$-AC of a Mach-Zehnder modulator a DC bias voltage 34 and a small sinusoidal AC voltage 37 of frequency f and amplitude $V_{in}$ are applied to the MZ modulator 32. The DC bias voltage 34 is adjusted until the power meter 50 indicates that the output power 114 is near a maximum value, and then further adjusting the DC bias voltage 34 until only the second harmonic of the modulating AC frequency f appears on the spectrum analyzer 48, as described above, at which point the output power 114 of the MZ modulator is oscillating about a maximum value (shown by curve 120). The average power $\psi(V_{in})$ 122 is measured using the power meter 50. The AC voltage 37 is then switched off, so that the only voltage 112 supplied to the MZ modulator is the DC bias voltage 118. The power $\psi(0)$ 124 is measured using the power meter 50. Using the values of $\psi(V_{in})$, $\psi(0)$, f, and $V_{in}$, the value of $V_\pi$-AC can be calculated numerically from the expression given above for the normalized power $\psi_N(V_{in})$.

In the preferred embodiment a sinusoidal AC voltage is used when measuring the average output power $\psi(V_{in})$ and calculating $V_\pi$, as a sinusoidal AC voltage is the simplest to generate and is also used to locate the peak when setting the DC bias voltage. However the scope of the invention includes the use of other forms of AC voltage.

What has been described is merely illustrative of the application of the principles of the invention. Other arrangements and methods can be implemented by those skilled in the art without departing from the spirit and scope of the present invention.

For example, instead of the specific transfer equation used in the above described embodiment mathematical equivalents may be used.

Additionally, although the invention described above is carried out by a human operator it should be appreciated that the method could easily be automated using a computer having a microprocessor running software defining the steps of the inventive method. As is conventional, the software would be incorporated in a computer readable storage medium such as a magnetic disc or CD ROM.

What is claimed is:

1. A method of determining an AC halfwave voltage of a Mach-Zehnder modulator (MZM) comprising:

biasing the MZM until the average optical power measured at an output of the MZM is a maximum;

applying an AC modulation voltage of known amplitude at the desired modulation frequency to the MZM;

measuring the average optical power at the output of the MZM with and without modulation; and determining the AC halfwave voltage of the MZM at the modulation frequency from a theoretical expression for the normalized average power of the output signal using the values for the amplitude and frequency of the AC modulation voltage, the average power of the modulated optical signal and the average power of the optical signal of the unmodulated optical signal.

2. The method of claim 1 wherein the AC modulation signal is a sinusoidal signal.

3. A computer readable medium carrying a computer program for carrying out the steps recited in claim 2.

4. The method of claim 1 wherein the theoretical expression for the normalized average power of the output signal is $$\psi_N(V_{in}) = \frac{\psi(V_{in})}{\psi(0)} = (1/T)\int_0^T \left[\cos\left(\frac{\pi}{2V_\pi}V_{in}\cos\left(\frac{2\pi}{T}t\right)\right)\right]^2 dt$$

where $\psi(V_{in})$ is the average power while the AC modulation voltage is being applied, $\psi(0)$ is the average power while no AC modulation is being applied, T is the reciprocal of the modulation frequency, $V_{in}$ is the amplitude of the AC modulation voltage, and $V_\pi$ is the AC halfwave voltage.

5. The method of claim 4 wherein the AC modulation signal is a sinusoidal signal.

6. A computer readable medium carrying a computer program for carrying out the steps recited in claim 5.

7. A computer readable medium carrying a computer program for carrying out the steps recited in claim 4.

8. A computer readable medium carrying a computer program for carrying out the steps recited in claim 1.

9. A method of determining an AC halfwave voltage of a Mach-Zehnder modulator (MZM) at a desired modulation frequency comprising:

applying a DC bias voltage to the MZM, applying an AC modulation voltage at the desired modulation frequency and a known amplitude to the MZM to derive at an output of the MZM a modulated optical signal having a fundamental harmonic and at least a second harmonic and a third harmonic, monitoring the modulated optical signal, adjusting the DC bias voltage until the average power of the modulated optical signal is near a maximum value, further adjusting the DC bias voltage until the fundamental harmonic and the third harmonic in the modulated optical signal no longer exist and the average power remains near the maximum value, measuring the average power of the modulated optical signal while the AC modulation voltage is being applied, removing the AC modulation voltage thereby deriving at an output of the MZM an unmodulated optical signal of the unmodulated optical signal, measuring the average power, and calculating the AC halfwave voltage of the MZM at the modulation frequency from a theoretical expression for the normalized average power of the output signal using the values for the amplitude and frequency of the AC modulation voltage, the average power of the modulated optical signal and the average power of the optical signal of the unmodulated optical signal.

10. The method of claim 9 wherein the AC modulation signal is a sinusoidal signal.

11. A computer readable medium carrying a computer program for carrying out the steps recited in claim 10.

12. The method of claim 9 wherein the theoretical expression for the normalized average power of the output signal is $$\psi_N(V_{in}) = \frac{\psi(V_{in})}{\psi(0)} = (1/T)\int_0^T \left[\cos\left(\frac{\pi}{2V_\pi}V_{in}\cos\left(\frac{2\pi}{T}t\right)\right)\right]^2 dt$$

where $\psi(V_{in})$ is the average power while the AC modulation voltage is being applied, $\psi(0)$ is the average power while no AC modulation is being applied, T is the reciprocal of the modulation frequency, $V_{in}$ is the amplitude of the AC modulation voltage, and $V_\pi$ is the AC halfwave voltage.

13. The method of claim 12 wherein the AC modulation signal is a sinusoidal signal.

14. A computer readable medium carrying a computer program for carrying out the steps recited in claim 13.

15. A computer readable medium carrying a computer program for carrying out the steps recited in claim 12.

16. A computer readable medium carrying a computer program for carrying out the steps recited in claim 9.

* * * * *